US010823751B2

United States Patent
Naslund et al.

(10) Patent No.: US 10,823,751 B2
(45) Date of Patent: Nov. 3, 2020

(54) AIRCRAFT PROBE WITH REMOVABLE AND REPLACEABLE EMBEDDED ELECTRONICS

(71) Applicant: Rosemount Aerospace Inc., Burnsville, MN (US)

(72) Inventors: Brian Brent Naslund, Chanhassen, MN (US); Matthew Paul Anderson, Burnsville, MN (US); Benjamin John Langemo, Shakopee, MN (US); Andrew Sherman, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 223 days.

(21) Appl. No.: 16/104,675

(22) Filed: Aug. 17, 2018

(65) Prior Publication Data

US 2020/0057091 A1 Feb. 20, 2020

(51) Int. Cl.
*G01P 5/17* (2006.01)
*G01C 5/06* (2006.01)
*G01C 9/00* (2006.01)

(52) U.S. Cl.
CPC ............... *G01P 5/17* (2013.01); *G01C 5/06* (2013.01); *G01C 9/005* (2013.01)

(58) Field of Classification Search
CPC .............. G01P 5/17; G01C 5/06; G01C 9/005
See application file for complete search history.

(56) References Cited

U.S. PATENT DOCUMENTS

| 5,423,209 | A | * | 6/1995 | Nakaya | G01F 1/46 |
| | | | | | 73/182 |
| 5,433,114 | A | * | 7/1995 | Cook | G01K 13/02 |
| | | | | | 374/E13.006 |
| 6,430,996 | B1 | * | 8/2002 | Anderson | G01K 13/028 |
| | | | | | 73/170.26 |
| 6,452,542 | B1 | * | 9/2002 | Bachinski | G01C 5/005 |
| | | | | | 342/357.75 |
| 6,591,696 | B2 | * | 7/2003 | Bachinski | G01P 5/165 |
| | | | | | 73/747 |
| 6,672,152 | B2 | | 1/2004 | Rouse et al. | |
| 7,490,510 | B2 | | 2/2009 | Agami et al. | |
| 7,716,980 | B1 | * | 5/2010 | Colten | G01P 5/165 |
| | | | | | 73/170.02 |
| 8,433,460 | B1 | * | 4/2013 | Recchia | F42B 15/01 |
| | | | | | 382/103 |

(Continued)

FOREIGN PATENT DOCUMENTS

| CN | 204705655 | U | 10/2015 |
| EP | 3190419 | A1 | 7/2017 |

(Continued)

OTHER PUBLICATIONS

Extended European Search Report for EP Application No. 19190617.1, Dated Jan. 17, 2020, pp. 7.

*Primary Examiner* — Nathaniel T Woodward
(74) *Attorney, Agent, or Firm* — Kinney & Lange, P.A.

(57) ABSTRACT

An aircraft probe includes a base, a strut that extends from the base, at least one port, and an electronics assembly insertable into the strut and removable from the strut. The electronics assembly includes at least one pressure sensor that is pneumatically connected to the at least one port to sense a first pressure when in the inserted position.

20 Claims, 3 Drawing Sheets

(56) References Cited

U.S. PATENT DOCUMENTS

| | | | |
|---|---|---|---|
| 9,128,109 B1* | 9/2015 | O'Neill | G01P 5/00 |
| 9,702,783 B2 | 7/2017 | DeAngelo et al. | |
| 9,933,449 B2 | 4/2018 | Frey, Jr. et al. | |
| 10,132,824 B2* | 11/2018 | Benning | G01K 13/028 |
| 2004/0261518 A1* | 12/2004 | Seidel | G01P 5/165 |
| | | | 73/182 |
| 2015/0276787 A1 | 10/2015 | Kimmel et al. | |
| 2016/0304210 A1 | 10/2016 | Wentland et al. | |
| 2017/0030941 A1* | 2/2017 | Sarno | B33Y 80/00 |
| 2017/0268902 A1* | 9/2017 | Rolinski | G01C 23/00 |
| 2018/0118370 A1 | 5/2018 | Millman | |
| 2019/0346476 A1* | 11/2019 | Whalen | G01F 1/46 |

FOREIGN PATENT DOCUMENTS

| | | | |
|---|---|---|---|
| EP | 3581938 A1 | 12/2019 | |
| WO | WO 2018081559 A1 | 5/2018 | |

* cited by examiner

AIRCRAFT PROBE WITH REMOVABLE AND REPLACEABLE EMBEDDED ELECTRONICS

BACKGROUND

The present invention relates generally to air data probes, and in particular to embedded electronics for air data probes.

Current air data systems utilize pneumatic connections between probes and remotely located air data transducers or air data computers. Alternative architectures utilize integrated probes and air data computers, but these integrated probes can significantly intrude into the fuselage, and in some applications this intrusion is prohibitive based on conflicting structure or components of the aircraft. Current air data systems with pneumatic connections to air data transducers or air data computers may also suffer from inadequate ability to detect degraded performance due to architecture definition. It is desirable to provide computational and other digital capabilities at the air data probe without intruding into the fuselage while also simplifying maintenance.

SUMMARY

In one example embodiment, an aircraft probe includes a base, a strut that extends from the base, at least one port, and an electronics assembly insertable into the strut and removable from the strut. The electronics assembly includes at least one pressure sensor that is pneumatically connected to the at least one port to sense a first pressure when in an inserted position.

In another example embodiment, an electronics assembly insertable into, and removable from, an aircraft probe, includes a pressure sensor and an input/output interface. The pressure sensor is positioned to be pneumatically connected with a port of the aircraft probe while the electronics assembly is inserted into the aircraft probe. The pressure sensor is configured to sense a pressure, and the input/output interface is configured to provide the sensed pressure to a data bus of an aircraft that includes the aircraft probe.

In another example embodiment, an aircraft air data system includes an aircraft data bus, consuming systems connected to the aircraft data bus, and an aircraft probe. The aircraft probe includes a base connected to the aircraft, a strut that extends from the base, a port, and an electronics assembly positioned within the strut that includes at least a pressure sensor pneumatically connected to the port to sense a pressure. The electronics assembly is removable from the aircraft probe through the base.

DETAILED DESCRIPTION

A fully integrated digital probe is disclosed herein that includes removable and replaceable electronics. The digital probe does not require external transducer(s). Pressure sensing for the probe is performed integral to the probe by the replaceable electronics. An electronics card, for example, may be slidably inserted into a strut of the probe such that the electronics card is easily replaceable. The electronics card may connect through the base of the probe, which may be electronically connected to an aircraft interface connector.

Figure 1:
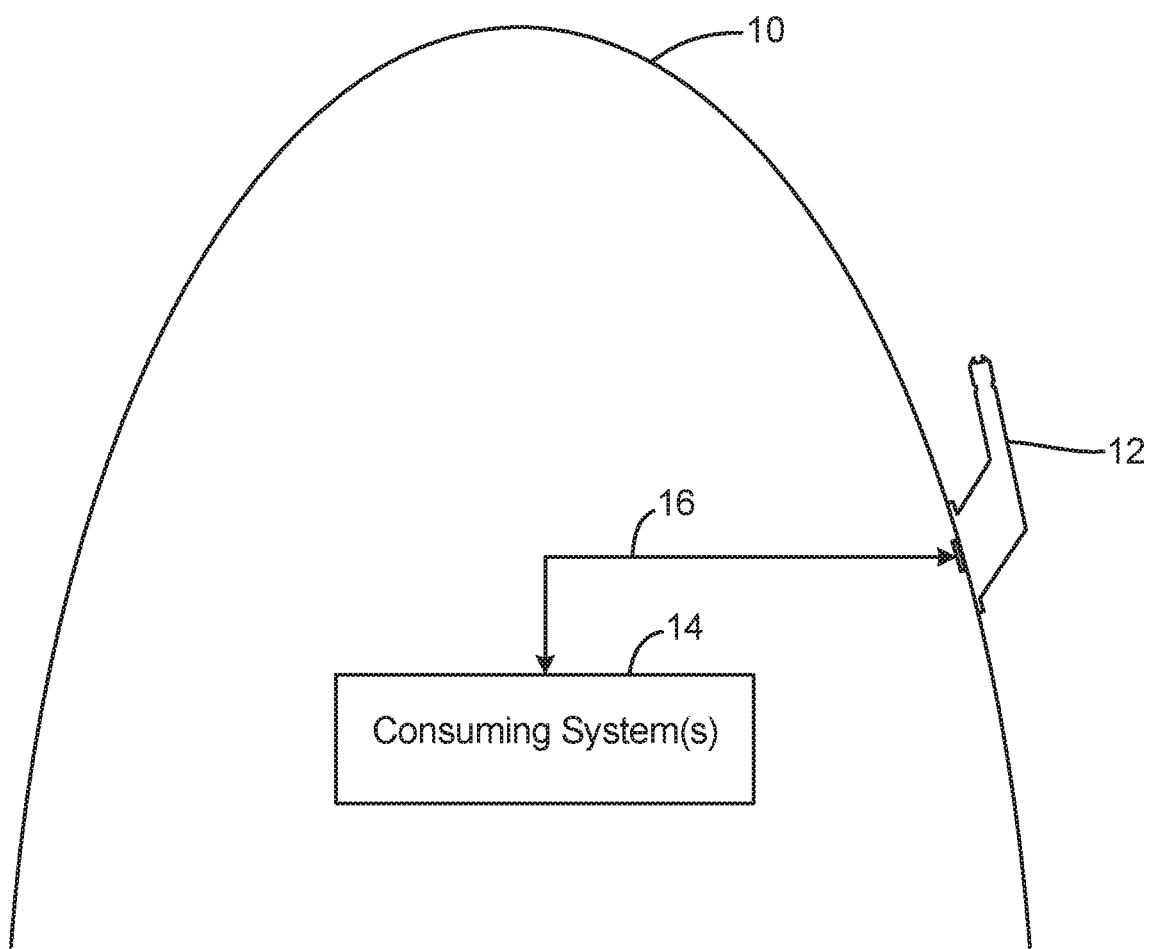
FIG. 1 is a schematic diagram illustrating an aircraft that includes an air data probe.

FIG. 1 is a schematic diagram that illustrates an aircraft 10 that includes air data probe 12. Probe 12 may be a standalone probe, or may be part of a larger air data system that includes one or more further sensors and/or probes. Probe 12 may be positioned and configured to sense one or more pressures external to aircraft 10, for example. The sensed pressure(s) may be used to calculate various parameters including, but not limited to, airspeed, altitude, angle of attack (AOA), and angle of sideslip (AOS). These parameters may be calculated by probe 12, or by consuming systems 14, which may be one or more computing systems located in aircraft 10 in an avionics or other electronics bay, for example. While illustrated as a pitot static probe, air data probe 12 may be any probe positioned on the exterior of aircraft 10 and may have any desirable shape based on the needs of the probe.

Air data probe 12 is connected to communicate with consuming systems 14 via aircraft data bus 16. Aircraft data bus 16 can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, Ethernet, or other analog or digital communication protocols.

Air data probe 12 connects to aircraft data bus 16 without significant intrusion into the fuselage of aircraft 10. Prior art systems utilized integrated probes and/or air data computers, but the structure of these devices, particularly the electronics, intruded significantly into the fuselage. This intrusion can be prohibitive for use on some aircraft due to conflicting structure. In contrast, probe 12 includes embedded electronics that are located within a strut of the probe, for example. Thus, significant intrusion into the fuselage of aircraft 10 by probe 12 is eliminated.

Figure 2A:
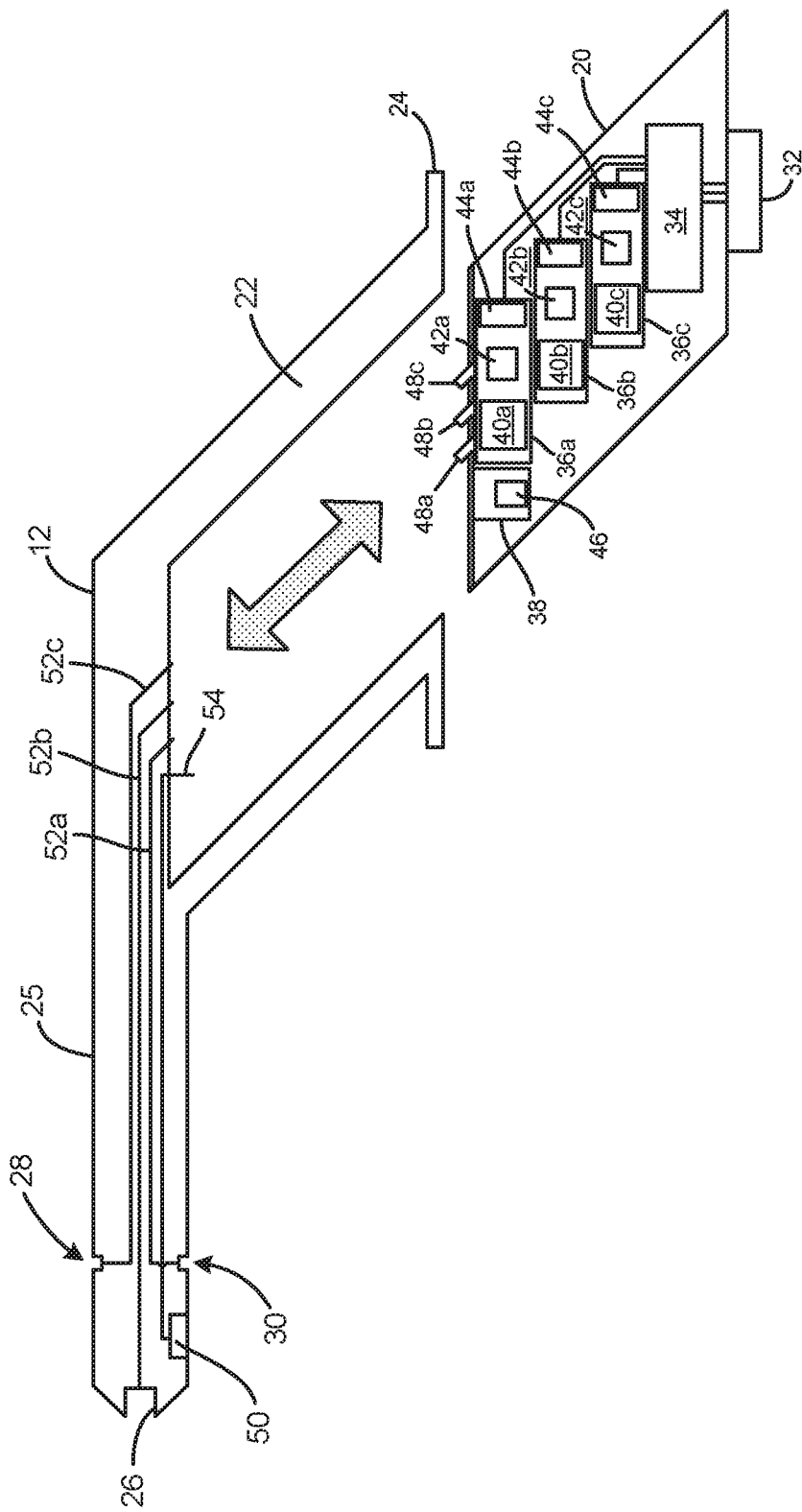
FIGS. 2A and 2B are schematic block diagrams of an air data probe with a removable electronics card in the removed position and the inserted position, respectively.
Figure 2B:
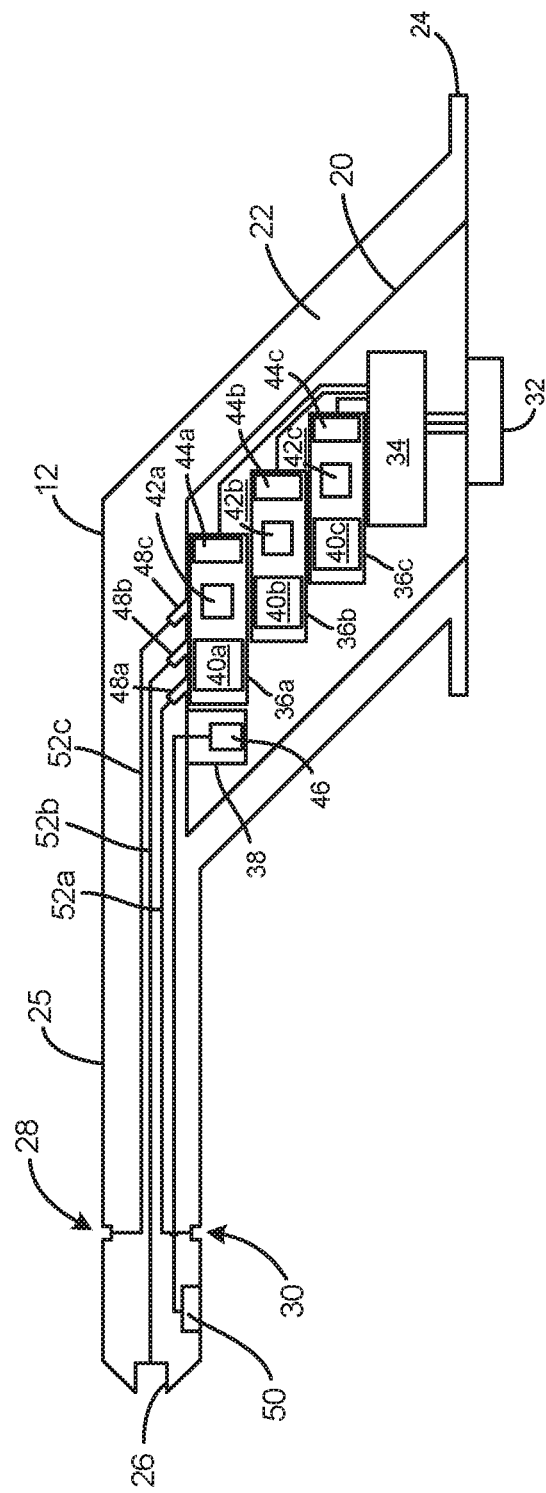

FIGS. 2A and 2B are schematic block diagrams of aircraft probe 12 having removable electronics card 20. FIG. 2A illustrates removable electronics card 20 in the removed position, and FIG. 2B illustrates removable electronics card 20 in the inserted position. Probe 12 includes strut 22 that extends from base 24, and barrel portion 25 that includes ports 26, 28, and 30. Removable electronics card 20 includes interface 32, control and input/output (IO) circuit 34, pressure sensing modules 36a-36c, and health monitoring circuit 38. Each pressure sensing module 36a-36c includes respective pressure sensing control circuit 40a-40c, respective pressure sensors 42a-42c, and respective interface circuits 44a-44c. Health monitoring circuit 38 includes a health monitoring application specific integrated circuit (ASIC) 46, for example. Removable electronics card 20 also includes pneumatic connectors 48a, 48b, and 48c which provide pneumatic connection to respective pressure sensors 42a, 42b, and 42c. Temperature sensor 50 is positioned within barrel portion 25 and connected to provide a sensed temperature to health monitoring circuit 38. Pneumatic connections 52a, 52b, and 52c are configured to provide a pneumatic connection between ports 26, 28, and 30, and respective pressure sensors 42a, 42b, and 42c.

Removable electronics card 20 is configured to slide in and out of probe 12. This allows for easy maintenance of the electronics of probe 12, for example. FIG. 2A illustrates removable electronics card 20 removed from probe 12. Other components of removable electronics card 20 may also be easily replaceable. For example, each pressure sensing module 36a-36c may be swappable so that in the event of a failure of one of the modules, the respective module may be easily replaced, without requiring replacement of the entire removable electronics card 20. This way, if any of the electronics of probe 12 fail or otherwise need maintenance, the failed components may be easily replaced without needing to replace the entire probe.

FIG. 2B illustrates removable electronics card 20 in the inserted position, embedded within probe 12. In the embodiment illustrated in FIGS. 2A and 2B, removable electronics card 20 slides into strut 22 of probe 12 through base 24. This may be accomplished using rails and snaps, or any other method. In other embodiments, removable electronics card 20 may slide into probe 12 through another location on probe 12. In the embodiment illustrated in FIG. 2B, when in the inserted position, only interface 32 extends below base 24, which minimizes intrusion of the components of probe 12 into the aircraft fuselage. Interface 32 may connect to aircraft data bus 16 (FIG. 1), for example, to allow communication of data from probe 12 to consuming systems 14 (FIG. 1). In other embodiments, a small portion of electronics card 20 or other components may extend below base 24.

While illustrated as including three ports 26, 28, and 30, and three respective pressure sensors 42a, 42b, and 42c, probe 12 may include any number of pressure sensing ports. In one example embodiment, removable electronics card 20 may include a single pressure sensing module 36a, and probe 12 may include a single port, such as port 26, for example. The single pressure sensor 42a may be configured to sense a pitot pressure. In this example, the entire interior of probe 26 may be hollow, and pneumatic connections 52a, 52b, and 52c may be eliminated. Pressure sensor 42a may be positioned anywhere on removable electronics card 20, positioned within the hollow chamber of probe 12, to sense the pitot pressure as the ambient pressure within strut 22. In one example, pressure sensing electronics 40a may be configured to convert the analog pressure signal from pressure sensor 42a into a digital signal, and condition the digital signal for transmission to aircraft consuming systems 14 on digital data bus 16, eliminating the need for a separate control and IO circuit 34. In other examples, a single pressure sensing module 36a may be utilized in conjunction with a control and IO circuit 34.

In the embodiment illustrated in FIGS. 2A and 2B, probe 12 includes several ports 26, 28, and 30, each positioned to allow sensing of various pressures. As seen in FIG. 2B, removable electronics card 20 includes pressure sensors 42a, 42b, and 42c, that are pneumatically connected to a respective port 26, 28, and 30 when removable electronics card 20 is in the inserted position. In one example embodiment, for example, pneumatic connections 52a, 52b, and 52c may be pneumatic tubes, and connection of respective ports 26, 28, and 30 and pressure sensors 42a, 42b, and 42c may be achieved through blind mating of each pneumatic tube 52a, 52b, and 52c with respective pneumatic connectors 48a, 48b, and 48c. While not illustrated, pneumatic connectors 48a, 48b, and 48c provide a pneumatic connection to each respective pressure sensor 42a, 42b, and 42c. A radial seal (not shown) may be positioned at the end of the pneumatic tube, for example, to facilitate blind mating with pneumatic connectors 48a, 48b, and 48c. This way, removable card 20 is inserted, each respective pressure sensor 42a, 42b, and 42c is pneumatically connected to the respective port 26, 28, and 30.

In some embodiments, including the embodiment illustrated in FIGS. 2A and 2B, removable electronics card 20 includes control and IO circuit 34. This circuit may include one or more of a microcontroller, microprocessor, ASIC, field programmable gate array (FPGA), one more volatile and/or non-volatile memories, data bus interface, and/or any other control or IO circuitry. In some embodiments, control and IO circuit 34 may only be configured to condition data sensed by pressure sensors 42a-42c for output on aircraft data bus 16 (FIG. 1) through interface 32. In other embodiments, control and IO circuit 34 may be configured to execute software to perform functions that include, for example, calculating air data parameters using the sensed values from pressure sensors 42a-42c.

In one embodiment, control and IO circuit 34 may be configured to determine an altitude, airspeed, and AOA from the sensed pressure data. For example, control and IO circuit 34 may receive raw pressure data from each of pressure sensors 42a, 42b, and 42c through respective interface circuits 44a, 44b, and 44c. Interface circuits 44a, 44b, and 44c may be configured, for example, to condition the sensed data for control and IO circuit 34. Control and IO circuit 34 may determine a pitot pressure from the raw pressure data from pressure sensor 42a, and static pressures from the raw pressure data from pressure sensors 42b and 42c. Using the pitot pressure and the two static pressures, control and IO circuit 34 can then calculate an altitude, airspeed, and AOA based on the pitot and static pressures. These parameters may then be provided to consuming systems 14 on aircraft data bus 16 through interface 32. In other embodiments, pressure sensing control circuit 40a, 40b, and 40c may be configured to convert the analog signal output by the respective pressure sensor 42a, 42b, and 42c into a digital signal.

While illustrated as a dedicated pressure sensor for each port, in other embodiments, one or more pressure sensing modules 36a-36c may include a differential pressure sensor pneumatically connected to two or more ports capable of sensing a differential pressure which may be used to determine, for example, AOA or AOS. While also illustrated as three ports and three pressure sensors, other embodiments may include six or more ports and six or more pressure sensors.

Temperature sensor 50 may be positioned within probe 12 for health monitoring, for example. During operation of probe 12, icing conditions can occur. To prevent icing, probes often include heaters, such as resistive heating elements, routed throughout the probe to provide heating for the probe. However, the probe can become hotter than is necessary to prevent icing, and this heat can have adverse effects on the other components of the probe. Temperature sensor 50 may be positioned to sense the temperature within probe 12 and provide the sensed temperature to health monitoring circuit 38. ASIC 46 of health monitoring circuit 38 may be configured, for example, to monitor the temperature of probe 12 to determine if the temperature is too hot or too cold, and provide instructions to adjust the control of the heating element. While not shown, removable electronics card 20 may also include one or more current sensors to monitor a current provided to a resistive heating element to provide health monitoring for the heater. Control and IO circuit 34 may also be configured to provide control for a resistive heating element of probe 12.

Removable electronics card 20 provides significant advantages. The removability and replaceability of both removable electronics card 20 itself, as well as components of removable electronics card 20 improves maintenance and lifespan of probe 12. Further, by embedding all electronics within strut 22, the amount that probe 12 intrudes into the fuselage of aircraft 10 can be limited.

Discussion of Possible Embodiments

The following are non-exclusive descriptions of possible embodiments of the present invention.

An aircraft probe includes a base, a strut that extends from the base, at least one port, and an electronics assembly insertable into the strut and removable from the strut. The electronics assembly includes at least one pressure sensor that is pneumatically connected to the at least one port to sense a first pressure when in an inserted position.

The aircraft probe of the preceding paragraph can optionally include, additionally and/or alternatively, any one or more of the following features, configurations and/or additional components:

A further embodiment of the foregoing aircraft probe, wherein the electronics assembly is insertable into the strut through the base.

A further embodiment of any of the foregoing aircraft probes, wherein the electronics assembly includes an input/output interface configured to interface with an aircraft data bus, and wherein the electronics assembly is configured to provide the first pressure on the aircraft data bus.

A further embodiment of any of the foregoing aircraft probes, further including a barrel portion that extends from the strut, wherein the at least one port comprises a first port, a second port, and a third port positioned on the barrel portion.

A further embodiment of any of the foregoing aircraft probes, wherein the at least one pressure sensor includes a first pressure sensor, a second pressure sensor, and a third pressure sensor, and wherein, while in the inserted position, the first pressure sensor is pneumatically connected to the first port to sense the first pressure, the second pressure sensor is pneumatically connected to the second port to sense a second pressure, and the third pressure sensor is pneumatically connected to the third port to sense a third pressure.

A further embodiment of any of the foregoing aircraft probes, wherein the first pressure is a pitot pressure and wherein the second pressure and the third pressure are static pressures.

A further embodiment of any of the foregoing aircraft probes, wherein the electronics assembly further includes a control circuit configured to calculate one or more of an airspeed of an aircraft that includes the aircraft probe, an altitude of the aircraft, an angle of attack of the aircraft, and an angle of sideslip of the aircraft, and wherein the control circuit is configured to provide the airspeed, the altitude, the angle of attack, and the angle of sideslip on an aircraft data bus connected to the electronics assembly.

A further embodiment of any of the foregoing aircraft probes, further including a temperature sensor positioned within the probe and connected to provide a sensed temperature to the electronics assembly.

A further embodiment of any of the foregoing aircraft probes, wherein the electronics assembly includes a health monitoring circuit configured to monitor the sensed temperature to monitor a temperature of the probe.

An electronics assembly insertable into, and removable from, an aircraft probe, includes a first pressure sensor and an input/output interface. The first pressure sensor is positioned to be pneumatically connected with a first port of the aircraft probe while the electronics assembly is inserted into the aircraft probe. The first pressure sensor is configured to sense a first pressure, and the input/output interface is configured to provide the first pressure to a data bus of an aircraft that includes the aircraft probe.

The electronics assembly of the preceding paragraph can optionally include, additionally and/or alternatively, any one or more of the following features, configurations and/or additional components:

A further embodiment of the foregoing electronics assembly, further including a second pressure sensor positioned to be pneumatically connected to a second port of the aircraft probe while the electronics assembly is inserted into the aircraft probe, wherein the second pressure sensor is configured to sense a second pressure, and wherein the first pressure is a pitot pressure and the second pressure is a static pressure.

A further embodiment of any of the foregoing electronics assemblies, further including a third pressure sensor positioned to be pneumatically connected to a third port of the aircraft probe while the electronics assembly is inserted into the aircraft probe, wherein the third pressure sensor is configured to sense a third pressure, and wherein the third pressure is a static pressure.

A further embodiment of any of the foregoing electronics assemblies, further including a control circuit configured to determine an airspeed, altitude, and an angle of attack from the first pressure, the second pressure, and the third pressure; wherein the input/output interface is further configured to provide the airspeed and the angle of attack on the data bus.

A further embodiment of any of the foregoing electronics assemblies, further including a health monitoring circuit configured to receive a sensed temperature from a temperature sensor positioned within the aircraft probe.

A further embodiment of any of the foregoing electronics assemblies, further including a pneumatic connector configured to mate with a pneumatic connection of the first port when the electronics assembly is inserted in the probe.

An aircraft air data system includes an aircraft data bus, consuming systems connected to the aircraft data bus, and an aircraft probe. The aircraft probe includes a base connected to the aircraft, a strut that extends from the base, a first port, and an electronics assembly positioned within the strut that includes at least a first pressure sensor pneumatically connected to the first port to sense a first pressure. The electronics assembly is removable from the aircraft probe through the base.

The aircraft air data system of the preceding paragraph can optionally include, additionally and/or alternatively, any one or more of the following features, configurations and/or additional components:

A further embodiment of the foregoing aircraft air data system, wherein the aircraft probe further includes a barrel portion that extends from the strut, wherein the at least one port comprises a first port, a second port, and a third port positioned on the barrel portion.

A further embodiment of any of the foregoing aircraft air data systems, wherein the at least one pressure sensor comprises a first pressure sensor, a second pressure sensor, and a third pressure sensor, and wherein, while in an inserted position, the first pressure sensor is pneumatically connected to the first port to sense the first pressure, the second pressure sensor is pneumatically connected to the second port to sense a second pressure, and the third pressure sensor is pneumatically connected to the third port to sense a third pressure.

A further embodiment of any of the foregoing aircraft air data systems, wherein the first pressure is a pitot pressure and wherein the second pressure and the third pressure are static pressures.

A further embodiment of any of the foregoing aircraft air data systems, wherein the electronics assembly further includes a control circuit configured to calculate one or more parameters derived from at least the first pressure, and wherein the control circuit is configured to provide the one or more parameters on the aircraft data bus.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft probe comprising:
a base;
a strut that extends from the base;
at least one port; and
an electronics assembly slidable inward to an inserted position located within the strut and slidable outward from the inserted position and the strut, wherein the electronics assembly includes:
at least one pressure sensor pneumatically connected to the at least one port to sense a first pressure, wherein the at least one pressure sensor is pneumatically connected to the at least one port by virtue of the electronics assembly sliding inward to the inserted position.

2. The aircraft probe of claim 1, wherein the electronics assembly is slidable into the strut through the base.

3. The aircraft probe of claim 1, wherein the electronics assembly includes an input/output interface configured to interface with an aircraft data bus, and wherein the electronics assembly is configured to provide the first pressure on the aircraft data bus.

4. The aircraft probe of claim 1, further comprising a barrel portion that extends from the strut, wherein the at least one port comprises a first port, a second port, and a third port positioned on the barrel portion.

5. The aircraft probe of claim 4, wherein the at least one pressure sensor comprises a first pressure sensor, a second pressure sensor, and a third pressure sensor, and wherein, by virtue of the electronics assembly sliding inward to the inserted position, the first pressure sensor is pneumatically connected to the first port to sense the first pressure, the second pressure sensor is pneumatically connected to the second port to sense a second pressure, and the third pressure sensor is pneumatically connected to the third port to sense a third pressure.

6. The aircraft probe of claim 5, wherein the first pressure is a pitot pressure and wherein the second pressure and the third pressure are static pressures.

7. The aircraft probe of claim 4, wherein the electronics assembly further includes a control circuit configured to calculate one or more of an airspeed of an aircraft that includes the aircraft probe, an altitude of the aircraft, an angle of attack of the aircraft, and an angle of sideslip of the aircraft, and wherein the control circuit is configured to provide the airspeed, the altitude, the angle of attack, and the angle of sideslip on an aircraft data bus connected to the electronics assembly.

8. The aircraft probe of claim 1, further comprising a temperature sensor positioned within the probe and connected to provide a sensed temperature to the electronics assembly.

9. The aircraft probe of claim 8, wherein the electronics assembly includes a health monitoring circuit configured to monitor the sensed temperature to monitor a temperature of the probe.

10. The aircraft probe of claim 1, further comprising a rail and a snap, wherein the electronics assembly is configured to be mechanically coupled to the snap and retained by the snap when in the inserted position and wherein the electronics assembly is configured to be slidable with the rail when the electronics assembly is sliding into the inserted position.

11. An electronics assembly slidable inward to an inserted position located within an aircraft probe and slidable outward from the inserted position and the aircraft probe, the electronics assembly comprising:
a first pressure sensor positioned to be pneumatically connected with a first port of the aircraft probe by virtue of the electronics assembly sliding inward to the inserted position within the aircraft probe, wherein the first pressure sensor is configured to sense a first pressure;
an input/output interface configured to provide the first pressure to a data bus of an aircraft that includes the aircraft probe; and
a pneumatic connector configured to mate with a pneumatic connection of the first port by virtue of the electronics assembly sliding inward to the inserted position.

12. The electronics assembly of claim 11, further comprising:
a second pressure sensor positioned to be pneumatically connected to a second port of the aircraft probe by virtue of the electronics assembly sliding inward to the inserted position within the aircraft probe, wherein the second pressure sensor is configured to sense a second pressure, and wherein the first pressure is a pitot pressure and the second pressure is a static pressure.

13. The electronics assembly of claim 12, further comprising:
a third pressure sensor positioned to be pneumatically connected to a third port of the aircraft probe by virtue of the electronics assembly sliding inward to the inserted position within the aircraft probe, wherein the third pressure sensor is configured to sense a third pressure, and wherein the third pressure is a static pressure.

14. The electronics assembly of claim 13, further comprising:
a control circuit configured to determine an airspeed, altitude, and an angle of attack from the first pressure, the second pressure, and the third pressure;
wherein the input/output interface is further configured to provide the airspeed and the angle of attack on the data bus.

15. The electronics assembly of claim 11, further comprising:
a health monitoring circuit configured to receive a sensed temperature from a temperature sensor positioned within the aircraft probe.

16. An aircraft air data system comprises:
an aircraft data bus;
consuming systems connected to the aircraft data bus; and
an aircraft probe comprising:

a base connected to the aircraft;
a strut that extends from the base;
a first port; and
an electronics assembly positioned within the strut;
wherein the electronics assembly is slidable inward to an inserted position located within the strut and slidable outward from the inserted position and the strut through the base; and
wherein the electronics assembly includes:
at least a first pressure sensor pneumatically connected to the first port to sense a first pressure, wherein the first pressure sensor is pneumatically connected to the first port by virtue of the electronics assembly sliding inward to the inserted position.

17. The aircraft air data system of claim 16, wherein the aircraft probe further comprises a barrel portion that extends from the strut, wherein the at least one port comprises a first port, a second port, and a third port positioned on the barrel portion.

18. The aircraft air data system of claim 17, wherein the at least one pressure sensor comprises a first pressure sensor, a second pressure sensor, and a third pressure sensor, and wherein, by virtue of the electronics assembly sliding inward to the inserted position, the first pressure sensor is pneumatically connected to the first port to sense the first pressure, the second pressure sensor is pneumatically connected to the second port to sense a second pressure, and the third pressure sensor is pneumatically connected to the third port to sense a third pressure.

19. The aircraft air data system of claim 18, wherein the first pressure is a pitot pressure and wherein the second pressure and the third pressure are static pressures.

20. The aircraft air data system of claim 16, wherein the electronics assembly further includes a control circuit configured to calculate one or more parameters derived from at least the first pressure, and wherein the control circuit is configured to provide the one or more parameters on the aircraft data bus.

* * * * *